C. S. McCARTHY, Jr.
MOTOR CULTIVATOR.
APPLICATION FILED DEC. 13, 1918.
1,437,667.
Patented Dec. 5, 1922.
4 SHEETS—SHEET 1.
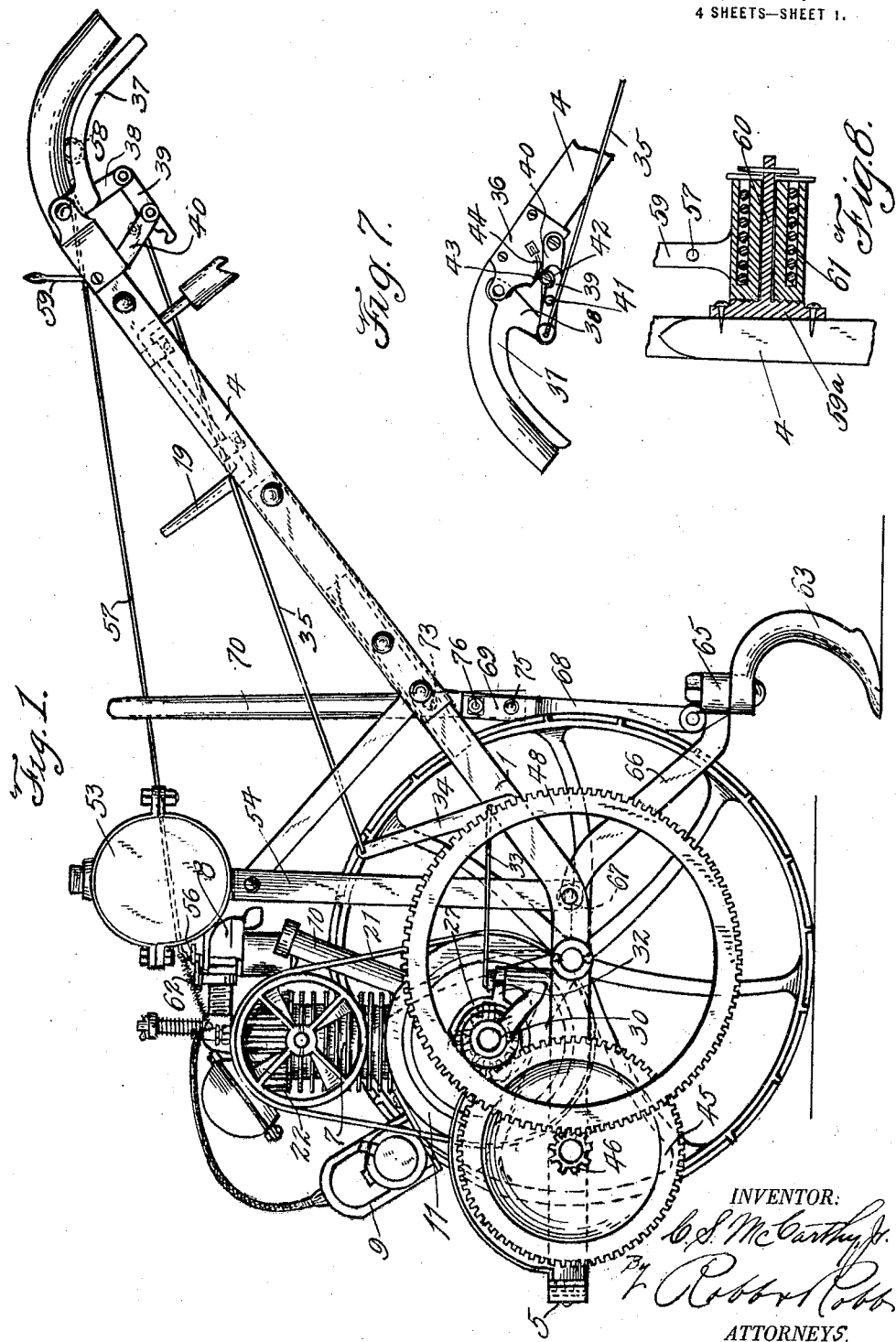
INVENTOR:
C. S. McCarthy Jr.
By Robert Robb
ATTORNEYS.

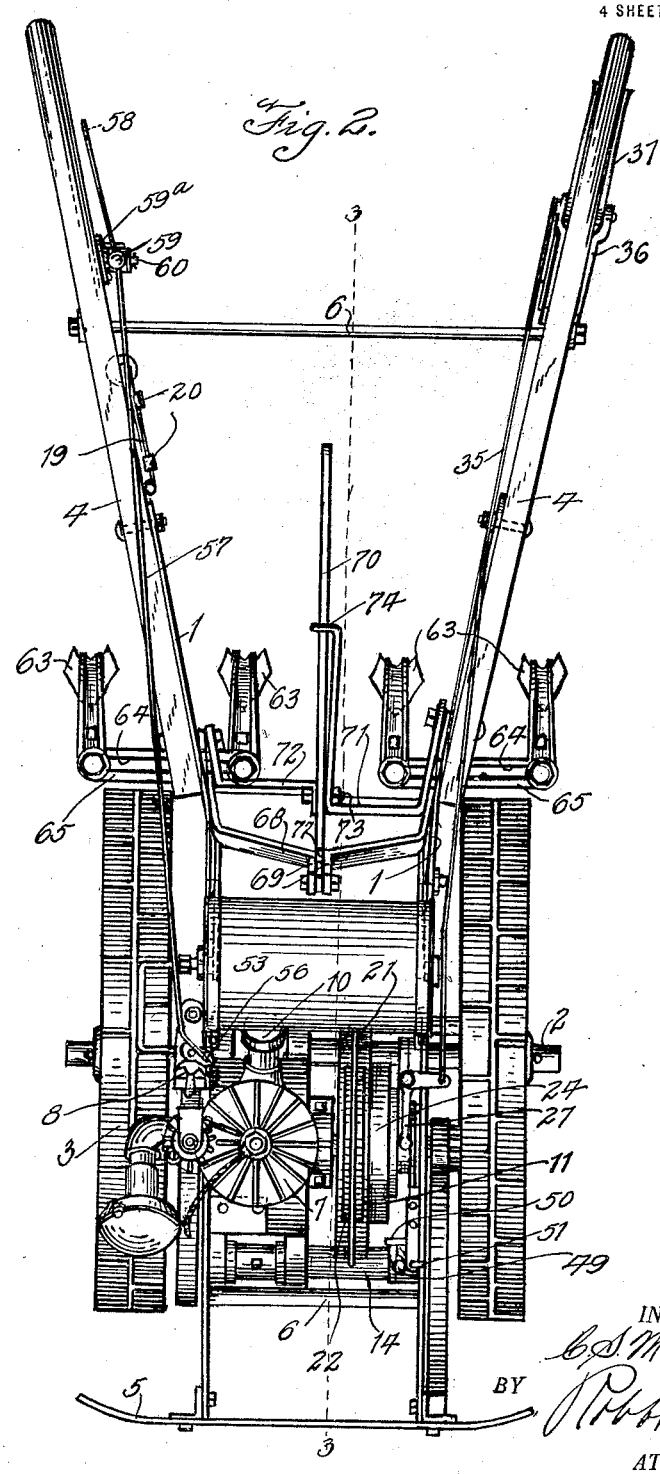

C. S. McCARTHY, Jr.
MOTOR CULTIVATOR.
APPLICATION FILED DEC. 13, 1918.
1,437,667.
Patented Dec. 5, 1922.
4 SHEETS—SHEET 3.
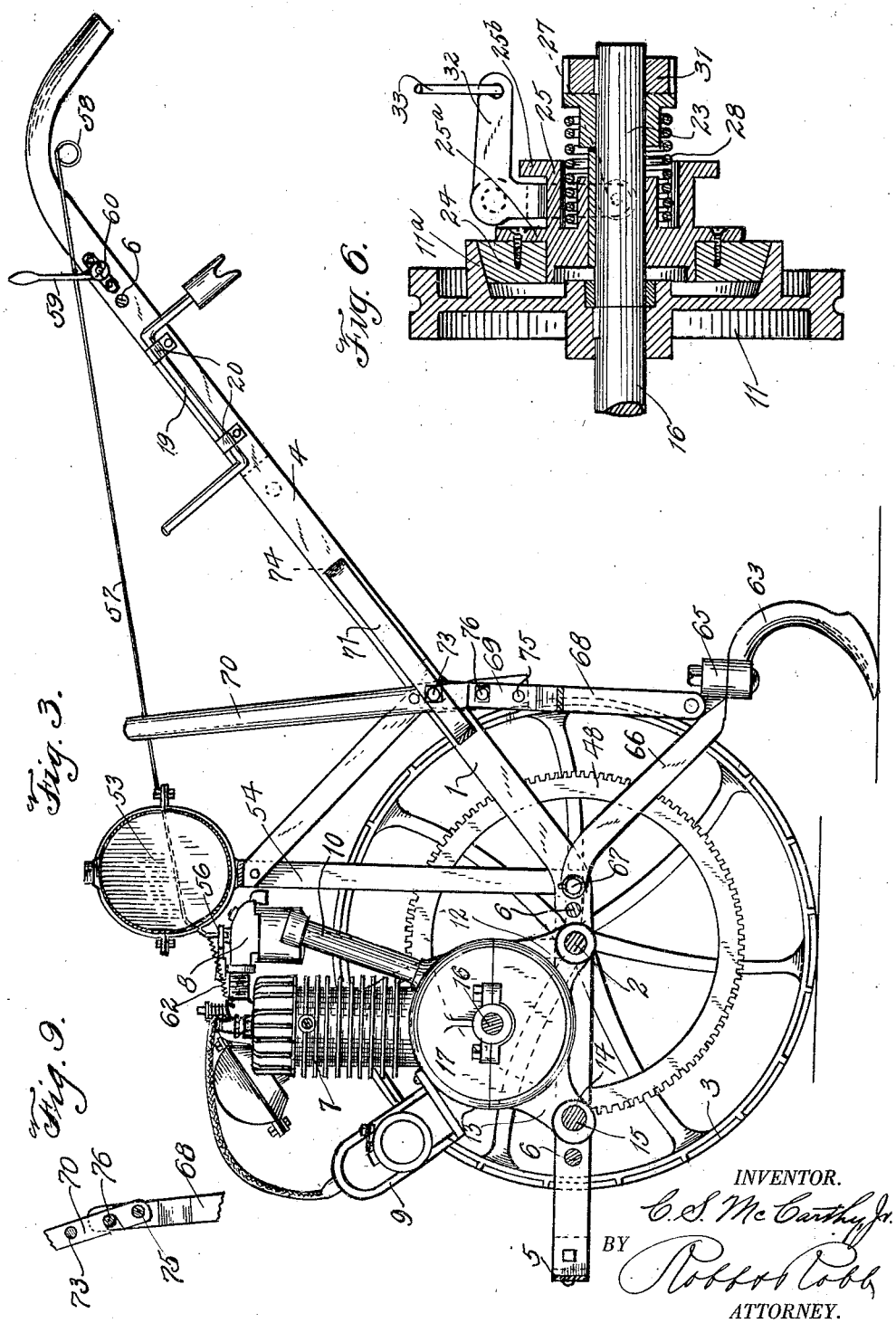

C. S. McCARTHY, Jr.
MOTOR CULTIVATOR.
APPLICATION FILED DEC. 13, 1918.

1,437,667.

Patented Dec. 5, 1922.
4 SHEETS—SHEET 4.

INVENTOR.
C. S. McCarthy Jr.
BY
Robert Pott
ATTORNEYS

Patented Dec. 5, 1922.

1,437,667

UNITED STATES PATENT OFFICE.

CHARLES S. McCARTHY, JR., OF SANDUSKY, OHIO, ASSIGNOR, BY MESNE ASSIGNMENTS, TO THE MOTOR MACULTIVATOR COMPANY, OF TOLEDO, OHIO, A CORPORATION OF OHIO.

MOTOR CULTIVATOR.

Application filed December 13, 1918. Serial No. 266,647.

*To all whom it may concern:*

Be it known that I, CHARLES S. McCARTHY, Jr., am a citizen of the United States, residing at Sandusky, in the county of Erie and State of Ohio, have invented certain new and useful Improvements in Motor Cultivators, of which the following is a specification.

The invention hereof appertains to the art of motor driven agricultural machinery, and the special type of implement comprising the improvements of the invention consists of a motor driven wheeled cultivator.

The cultivator embodied in this invention is primarily designed for the cultivation of truck farms though it will be observed upon an understanding of the invention that its utility is not to be confined solely to the class of agriculture devoted to the growth of truck produce.

While I have designed as a part of my general machine certain novel earth working devices these form the subject matter of a separate application for patent, the improvements hereinafter set forth including primarily a novel construction of wheeled frame adapted particularly for carrying cultivating tools such as used for the purpose above referred to; a special mounting and relative arrangement of the motor and cultivating tools, irrespective of the specific form of the latter, whereby a nicely balanced implement is obtained relieving the operator of abnormal pull or pressure at the handles of the machine; certain improved controlling means for the motor and for the clutch mechanism, the latter utilized for disconnecting the motor from the ground wheels in a well-known manner; together with novel instrumentalities whereby the ground wheels may be entirely ungeared relatively to the driving connections leading to the motor so as to facilitate the free movement of the implement over the ground when the motor is at rest; and other improved features of construction having to do primarily with specific refinements of design.

A period of considerable experiment with machines of the class to which my invention relates has led me to consider that a motor cultivator for the purposes of this invention should embody three essential characteristics, namely, first—a general design or construction as nearly approximating that of ordinary wheeled cultivators as it is possible to obtain; second—a relative arrangement of the earth working devices and traction wheels so as to bring the former as close to the point of traction as possible to decrease to a minimum degree the extent of lateral deflection of the earth working tools incident to lateral movement of the controlling handles; and third—an arrangement of the motor cultivating and other parts such as will not place upon the operator undue strains or pressures conducive to quick fatigue, said arrangement being furthermore simplified to a maximum degree for purposes obvious to those skilled in the art. These various desiderata I have accomplished in the practical embodiment of my invention under working conditions.

For a full comprehension of my improvements including the detailed features of construction and operation, reference is to be had to the following description and to the accompanying drawings in which:

Figure 1 is a side elevation of a motor cultivator embodying the invention, the near ground wheel omitted to make more clear the illustration;

Figure 2 is a top plan view of the same, the gasoline tank omitted to show parts located therebeneath;

Figure 3 is a longitudinal sectional view about on the line of 3—3 of Figure 2, bringing out more clearly the method of supporting the motor;

Figure 6 is a sectional view of the clutch devices;

Figure 7 is a view showing the toggle-lever lock for the clutch mechanism, in active position;

Figure 8 is a detail section of the adjustable stop for the throttle rod; and

Figure 9 is a fragmentary section of the connections of the lever and shovel raising and lowering parts.

Referring now to the drawings, similar reference characters are applied to similar parts throughout said drawings, and correspondingly identified hereinafter.

Figure 5:
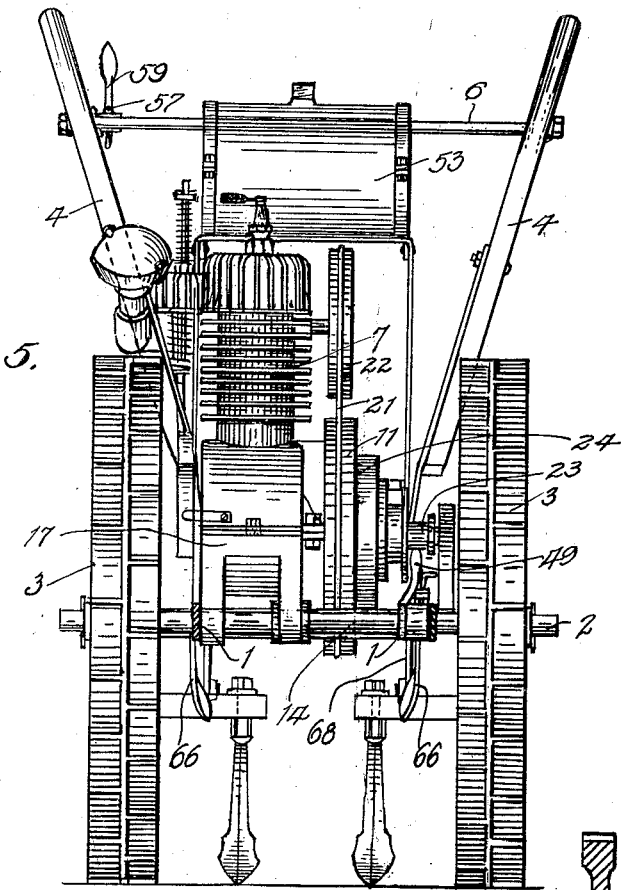
Figure 5 is a front view of the implement, the magneto omitted as well as some other parts for purposes of clearance.
Figure 4:
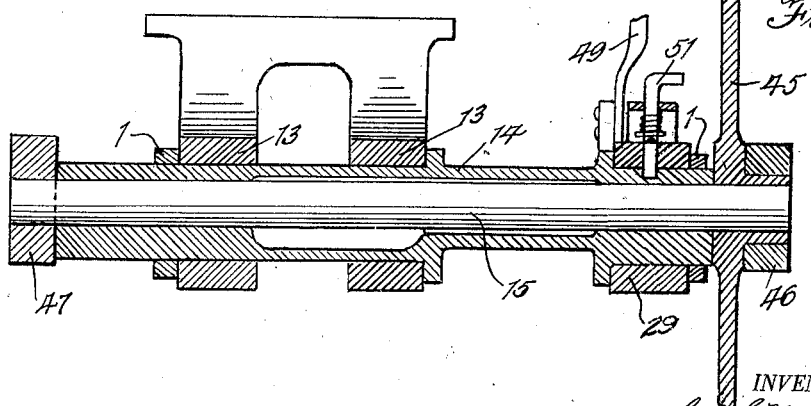
Figure 4 is a view more clearly showing the gear unmeshing device.

Frame construction.

The frame of my machine embodies spaced frame or side members 1 connected at a point intermediate their ends with the axle 2 upon which the ground wheels 3 are mounted. In effect the axle 2 constitutes a fulcrum for the frame or side members 1, and said frame members extend rearwardly from the axle and have bolted or suitably secured thereto the handles 4 by which the movement of the cultivator is controlled in a manner quite similar to the operation of any common wheeled implement of this type. The frame members 1 extend a considerable distance forward from the axle 2 and carry at their front ends a fender 5, the extremities of which extend in front of the wheels, as shown clearly in Figure 2. The wheels 3 are ribbed or otherwise formed on their rims for the purpose of increasing their tractive effect upon the ground traversed thereby. Cross-rods 6, one near the front end of the frame members 1, another just in rear of the axle 2, and a third connecting the handles 4, constitute the primary transverse connections between the side elements of the frame.

Motor and supporting means.

The motor 7 used by me, generally speaking, may be of a conventional type consisting preferably of a single cylinder engine equipped with suitable carburetor 8, magneto 9, oil filling tube 10, fly-wheel 11, and other conventional parts such as the exhaust, valves, sparking plug, and incidental parts ordinarily provided, but which will not be referred to because immaterial to the invention. I utilize a peculiar method of supporting the motor however by which there is virtually constituted a counter balance weight in front of the axle 2, supported on the frame members 1 so as to substantially balance the earth working devices and certain other parts carried by the frame members 1 in rear of said axle. With the above in view, I have provided on the base of the engine 7 rearwardly extending arms 12 through which the axle passes to form a supporting member for said engine, thus connecting the engine with the frame members 1, and somewhat similar arms 13 extend from the base of the engine in a forward direction and are connected with the forward portion of the frame members 1 by means of a sleeve shaft 14 suitably bolted in bearings formed in said frame members. The shaft 14 has a driven shaft 15 passing therethrough, said shaft 14 forming a part of means to be hereinafter set forth, whereby the driven shaft 15 may be ungeared from the ground wheels 3.

The manner in which the engine 7 constitutes a sort of counter balance weight will be apparent from the foregoing. The engine or driving shaft 16 projects slightly from the right hand side of the motor crank shaft casing 17 and is equipped with a crank pin 18 engageable by the crank 19 which is ordinarily carried by the right hand handle 4, spring clips being attached to the handle to hold the crank 19 in a removable manner so that the crank may be quickly used when it is desired to turn over the shaft 16 in starting the engine 7. The left hand end of the driving or crank shaft 16 carries the flywheel 11 previously mentioned, said wheel having an endless belt connection 21 leading upwards to a fan wheel 22 situated so that its blades drive currents of cooling air laterally against the cylinder of the motor 7. The fly-wheel 11 is keyed to the driving shaft 16 aforesaid, as shown best in Fig. 6 and mounted in alignment with the engine shaft 16 is the drive shaft 23. The shaft 23 virtually abuts at its inner end with the left hand end of the shaft 16. A clutch is used to connect the two shafts 16 and 23.

Clutch mechanism.

The fly-wheel 11 is formed with a clutch flange 11ᵃ attached to receive therein and to engage the circular clutch member 24 which may be made of wood or composition or the like. The clutch member 24 is carried by the annulus 25 which comprises the flanges 25ᵃ and 25ᵇ. Between the flanges 25ᵃ and 25ᵇ operate rollers carried between upper and lower arms of the clutch shifting yoke 27. The annulus 25 is keyed to the shaft 23 and the coiled spring 28 normally presses the annulus laterally in a direction to engage the clutch parts 11ᵃ and 24. The yoke 27 is pivoted to a bracket plate 29, the rear end of which has the axle 2 passing therethrough and the front end of which has the sleeve shaft 14 passing therethrough, said plate being bolted or otherwise attached to the left frame member 1. The bracket plate 29 has an upwardly extending arm 30 formed with a bearing receiving the outer end of the shaft 23, said outer end of the shaft carrying a fixed pinion 31, one side of which forms a bearing for the adjacent end of the spring 28. A short lateral arm 32 projects from the clutch yoke and a short rod 33 connects said arm with an approximately vertical lever 34 pivoted to the adjacent frame member 1. The upper end of the lever 34 has a rod 35 attached thereto which leads back to the left handle 4, on the hand grip of which is secured a casting 36 having the pressure piece 37 pivoted thereto. Pressure piece 37 has a downwardly projecting arm 38 with which the rear end of the rod 35 is connected. I provide a peculiar contrivance for holding the rod 35 retracted rearwardly to maintain the clutch devices disengaged. This means consists virtually of a toggle-lever composed of a rear link 39 and a front link 40 pivoted respectively at opposite ends to the parts 38 and the casting 36. The links 39 and 40 are pivoted together at 41 and the link 39 projects forward beyond the pivot 41 and has a notch 42 to engage a pin 43 by which the upward toggle movement of the links is limited. A spring 44 fixed to the casting 36 engages and tends to force downwardly the link 40, whereby to cause break joint action of the toggle-lever. If the operator wishes to momentarily disengage the motor from the drive shaft 23 this may be done by pressure upward on the pressure piece 37. To temporarily maintain disengagement, as when the operator leaves the machine for a short time but does not wish to shut down his engine, the pressure piece 37 may be pressed and the toggle-lever pushed upwards until it reaches its locking position shown in Figure 7 in full lines. Thereafter, to re-engage the clutch devices a slight pressure on part 37 will permit the spring 44 to push downwards on the link 40 and cause the toggle-lever to break joint and permit the clutch parts to resume cooperative engagement.

*Ground wheel drive mechanism.*

Obviously, when the clutch parts 11ª and 24 are connected the shaft 23 will be operated and the pinion 31 thereon correspondingly operated. The pinion 31 meshes with a relatively large gear 45 which gear is rigid on the left hand end of the driven shaft 15 previously described as being mounted in the sleeve shaft 14. The shaft 15 passes through the gear 45 and is equipped on its left end with the fixed pinion 46. The end of the shaft 15 opposite that carrying the pinion 46 has a similar pinion 47, and the two pinions 46 and 47 are adapted to mesh with the teeth of the large gear rings 48 attached to the ground wheels 3 by being bolted or otherwise secured to the spokes of said wheels. Obviously the driving of the large gear 45 on the shaft 15, by reason of its connection with the shaft 23, will transmit motion from the shaft 23 through the shaft 15 to the ground wheels 3 by reason of the intermeshing parts 46, 47, and 48. A forward or progressive movement of the ground wheels is thus insured so long as the meshing relation of the gear elements 46, 47, and 48 is maintained, and so long as the clutch devices are active during operation of the engine.

*Ungearing mechanism.*

Obviously when the engine is in use and connected with the ground wheels the latter will be turned at a certain ratio of speed determined by the speed of the engine and the ratios of the gears of the trains of gearing. It is desirable, under certain conditions, as for instance when the cultivator is being moved to the place where work is to start, that the ground wheels be entirely disconnected from the driving parts above set forth. This renders the implement very easily movable over the ground in an obvious manner. The disengagement of the gears is effected by mounting the driven shaft 15 eccentrically in the sleeve shaft 14. Thus, when the sleeve shaft 14 is turned in one direction, as by grasping and forcing forwardly a handle 49 fixed to the sleeve, the shaft 15 will be obviously carried forwards sufficiently to disengage the teeth of the pinions 46 and 47, from the teeth of the gear rings 48. A reverse or rearward movement of the handle 49 turning the shaft 14 in a like direction permits of intermeshing the teeth of the gear parts just mentioned. Said rearward movement of the handle 49 may be limited by a stop 50 extending from the bracket plate 29 into the path of the handle, and the sleeve shaft 14 carrying the same may be locked in such position, namely, with the gear parts intermeshed, by a vertically movable detent pin 51 mounted on a small bracket 52 attached to the upper side of the bracket plate 29. The detent pin 51 is spring depressed so as to operate through an opening in the front end of the bracket plate 29 and engage in an opening in the sleeve shaft 14.

*Hydro-carbon supply and control means.*

The gasoline or hydro-carbon used by the engine is supplied by conventional connections between the head of the engine and the gasoline tank 53. This tank is supported on a U-shaped standard 54, the lower ends of which are bolted to the frame members 1 in rear of the axle 2. Inclined braces connect the upper ends of the standard 54 with the frame members 1 at points adjacent to the lower ends of the handles 4. Leading from the gasoline valve arm 56 rearwards is the throttle rod 57 which terminates at its rear extremity in a loop 58 adjacent the hand grip of the right handle 4. The rod 57 passes through an adjustable stop lever 59 rotatably mounted on the right handle 4. The stop lever 59 may be moved forwardly or rearwardly, being formed adjacent its axis with a tubular bearing, one end of which is serrated to engage the serrated portion of a plate 59ª provided with a pin 60 forming the axis of said lever. A spring 61 housed by the pivoted portion of the lever 59 tends to maintain engagement between the serrated portion of the lever and the serrated portion of the plate 59ª. A cotter pin passes through the rod 57 in rear of the lever 59 and limits the forward movement of the throttle rod, acting under the pull of a spring 62 attached to the front extremity of said rod. Adjustment of the lever 59 forwardly or rearwardly determines the extent of permanent opening of the throttle valve of the engine and is variable in accordance with varying conditions of service. The loop 58 is pulled whenever desired to accelerate the engine.

Earth working devices.

The earth working or operating devices used in connection with my cultivator may be of different types dependent of course upon the particular class of work to be performed. Those which I show may preferably, though not necessarily, be employed, and they comprise cultivating teeth or shovels 63 laterally adjustable in slots 64 of spaced carriers 65. The carriers 65 each have a forwardly extending arm 66 pivoted to the frame members 1 by the fastenings which connect the lower portions of the U-shaped standard 54 with said frame members 1. The point of pivotal connection of the arms 66 with the parts 1 are designated by 67. For the adjustment of the earth working devices 63 I employ a supporting yoke 68, the sides of which are pivotally connected at their lower ends with the rear extremities of the arms 66. Said sides of the yoke 68 are formed with vertical extensions 69 at their upper extremities receiving therebetween a lever 70. The lever 70 has a series of openings intermediate its ends by which it may be adjustably fulcrumed upon a bracket device disposed between the frame members 1 at the lower extremities of the handles 4. The bracket device is made in two parts, a U-shaped part 71 bolted to the left handle 4 and the double angled part 72 bolted to the right handle 4. A bolt 73 connects these parts 71 and 72 and forms the pivot or fulcrum of the lever 70. The innermost portion of the U-shaped part 71 of the bracket device extends quite a little distance rearwards from the pivot 73 and is bent laterally to form a hook 74 beneath which the lever 70 may be engaged when pressed rearwardly and downwardly. Obviously a rearward and downward pressing of the lever 70 will raise the yoke 68 and the connected earth working devices 63, because the lower end of the lever 70 is attached pivotally to the lowermost one of two bolts or fastenings 75 and 76 by which the side parts of the yoke 68 are connected together. The arrangement of the bolts 75 and 76 and the formation of a laterally inclined slot 77 in the lower end portion of the lever 70, just above the opening through which the lower bolt 75 passes, affords a peculiar functioning of the parts in the following manner. By disengaging the lever 70 from beneath the hook 74 of the bracket device part 71, and rasing said lever, the lever and the yoke 68 will be caused to move into substantial alignment. In matter of fact, the lever will move forwardly toward the gasoline tank 53 slightly beyond a position of near alignment with the yoke 68 owing to the formation of the slot 77 in the lever, said slot receiving the bolt 76 and the latter forming a stop preventing undue forward movement of the lever. With the parts thus adjusted the lever 70 virtually forms a locking member rigidly maintaining the cultivating shovels or earth working devices at their lowermost adjustment which is their earth working position, it being required that the lever 70 be forced rearwardly to after a manner effect a break joint action between the parts 70 and 68 before the earth working devices can be elevated.

Miscellaneous features.

I contemplate the provision of suitable housing parts 78 for the gear 45 and pinion 46, and possibly other gears and pinions which I use, this feature not being material to the invention. Of course suitable grease cups or other lubricating means will be provided for all bearings, where necessary.

It is notable however that the motor and certain driving connections are disposed in advance of the axle 2 whilst the gasoline tank, its supports, and the earth working devices and other adjacent parts are located in rear of said axle. Furthermore, these various parts upon opposite sides of the axle are substantially balanced in an advantageous manner rendering the operation of the cultivator very easy, owing to the fact that no undue load is placed upon the operator.

Another feature of importance in my construction has to do with the location and arrangement of the motor and adjacent parts such that I secure a considerable amount of clearance space between the wheels of my implement whereby rows of plants to be cultivated may be readily straddled, and other advantages are resultant, as will be apparent to those versed in using cultivating devices of the character of the invention.

Again, by the peculiar disposition of the motor and gear mechanism in advance of the axle of my implement I am enabled to connect the earth working devices to operate very close to the points of tractive engagement of the ground wheels with the earth. In this manner I produce what may be virtually said to be a short leverage connection between the earth working devices and the frame of the machine such that slight lateral movement of the frame does not tend to create a large amount of lateral throw of the shovels or teeth or cultivating instrumentalities, whatever they may be.

The general simplicity of my machine is highly conducive to its lightness, strength, and ease of manipulation, as well as comparative cheapness of construction, all essential requirements of a cultivator adapted for the purposes of this invention.

By reason of locating the operating means for the ungearing devices at the front of the implement it will be apparent that under practical conditions of use the operator will have to throw out the clutch, in other words, discontinue the drive to the ground wheels so that the cultivator will stop, before the gear unmeshing can be effected. There is no liability, therefore, of intermeshing of the gears while the engine is running and operating the driving gearing, which might cause stripping of the pinions and gears.

Having thus described my invention, what I claim as new is:—

1. In a motor driven implement of the class described, the combination of an axle and ground wheels mounted thereon, a frame, handles connected with the frame whereby to direct the progress of the implement and whereby the implement may be manually propelled when desired, a motor on the frame, driving connections between the motor and ground wheels including a clutch controlled from the handles enabling the motor to run idle without progression of the machine, and additional and independent means to render said driving connections inactive so the ground wheels may freely turn to facilitate manual propulsion of the implement, the last means arranged so that to operate the same the operator must move from his clutch operating position.

2. In a motor driven implement of the class described, the combination of an axle and ground wheels mounted thereon, a frame, handles connected with the frame whereby to direct the progress of the implement and whereby the implement may be manually propelled when desired, a motor on the frame, driving connections between the motor and ground wheels including a clutch enabling the motor to run idle without progression of the machine, means to render said driving connections inactive so the ground wheels may freely turn to facilitate manual propulsion of the implement, consisting of a gear shaft, and means to shift said shaft bodily.

3. In a motor driven implement of the class described, the combination of an axle and ground wheels mounted thereon, a frame including spaced side members pivotally supported intermediate their ends by said axle, a power plant at one side of the axle and comprising an engine, means connecting the engine with the axle, a transverse member carried by the side members and also connected with the engine whereby it cooperates with the axle to support the engine jointly therewith, means on the frame at the other side of the axle, approximately balanced by the engine, including handles attached to said side members, and operating devices so associated with the frame as to be counter-balanced by the engine, driving connections intermediate the engine and ground wheels comprising the transverse member aforesaid, said transverse member embodying a driven shaft, gearing intermediate said shaft and the ground wheels, and clutch means to connect said shaft with the engine.

4. In a motor driven implement of the class described, the combination of an axle and ground wheels mounted thereon, a frame including spaced side members pivotally supported intermediate their ends by said axle, a power plant at one side of the axle and comprising an engine, means connecting the engine with the axle, a transverse member carried by the side members and connected with the engine whereby the engine acts as a counterbalance weight on the frame, means on the frame at the other side of the axle, approximately balanced by the engine, including handles attached to said side members, and operating devices so associated with the frame as to be counterbalanced by the engine, driving connections intermediate the engine and ground wheels comprising the transverse member aforesaid, said transverse member embodying a driven shaft, gearing intermediate said shaft and the ground wheels, clutch means to connect said shaft with the engine, and means for shifting said shaft whereby to render active or inactive the gearing connecting it with the ground wheels.

5. In a motor driven implement of the class described, the combination of an axle and ground wheels mounted thereon, a frame, a motor on said frame, handles connected to and extending rearwards from the frame for directing the movement of the implement, driving connections between the motor and ground wheels, a device located at the front of the frame for rendering said connections inactive, and additional and independent means leading to the handles for controlling the motor.

6. In a motor driven implement of the class described, the combination of an axle and ground wheels mounted thereon, a frame, a motor on said frame, handles connected with the frame whereby to direct the progress of the implement and whereby the implement may be manually propelled when desired, a motor on the frame, driving connections between the motor and ground wheels including a clutch enabling the motor to run idle without progression of the machine, and additional and independent means to render said driving connections inactive so the ground wheels may freely turn independently of the motor and driving connections to facilitate manual propulsion of the implement.

7. In a motor driven implement of the class described, the combination of an axle and ground wheels mounted thereon, a frame, a motor on said frame, handles connected with the frame whereby to direct the progress of the implement and whereby the implement may be manually propelled when desired, a motor on the frame, driving connections between the motor and ground wheels including a clutch enabling the motor to run idle without progression of the machine, means to render said driving connections inactive so the ground wheels may freely turn to facilitate manual propulsion of the implement, consisting of a gear shaft, and eccentric means to shift said shaft to and from operative position.

8. In a motor driven implement of the class described, the combination of an axle and ground wheels mounted thereon, a frame, a motor on said frame, handles connected to and extending rearwards from the frame for directing the movement of the implement, driving connections between the motor and ground wheels, a device located at the front of the frame for rendering said connections inactive, clutch mechanism independent of and in addition to the said device to render inactive said driving connections so the implement may remain at rest while the motor runs idle, and means leading to the rear of the machine adjacent to the handles for controlling said clutch.

9. In a motor driven implement of the class described, the combination of an axle and ground wheels mounted thereon, a frame, a motor on said frame, handles connected to and extending rearwards from the frame for directing the movement of the implement, driving connections between the motor and the ground wheels, a device located at the front of the frame for rendering said connections inactive, clutch mechanism to render inactive said driving connections so the implement may remain at rest while the motor runs idle, and means leading to the rear of the machine adjacent to the handles for controlling said clutch, consisting of a pressure piece on one handle, a rod connected to said piece, and a toggle-lever on said handle operative to hold the pressure piece in a predetermined position.

10. In a motor driven implement of the class described, the combination of an axle and ground wheels mounted thereon, a frame, a motor on said frame, handles connected to and extending rearwards from the frame for directing the movement of the implement, driving connections between the motor and the ground wheels, a device located at the front of the frame for rendering said connections inactive, clutch mechanism to render inactive said driving connections so the implement may remain at rest while the motor runs idle, means leading to the rear of the machine adjacent to the handles for controlling said clutch, consisting of a pressure piece on one handle, a rod connected to said piece, and a toggle-lever on said handle operative to hold the pressure piece in a clutch releasing position, and a spring arranged to cause break joint action of said lever.

11. In a motor driven implement of the class described, the combination of an axle and ground wheels mounted thereon, a frame, a motor on said frame, handles connected to and extending rearwards from the frame for directing the movement of the implement, driving connections between the motor and ground wheels, a device located at the front of the frame for rendering said connections inactive, means leading to the handles for controlling the motor, consisting of a rod having a finger loop adjacent to one handle, an adjustable stop on the handle, and means interengaging the rod and stop.

12. In a motor driven implement of the class described, the combination of an axle and ground wheels mounted thereon, a frame including spaced side members pivotally supported intermediate their ends by said axle, a power plant at one side of the axle and comprising an engine, means connecting the engine with the axle, a transverse member carried by the side members and connected with the engine whereby the engine acts as a counterbalance weight on the frame, means on the frame at the other side of the axle including handles attached to said side members, and operating devices associated with the frame, driving connections intermediate the engine and ground wheels comprising the transverse member aforesaid, said transverse member embodying a driven shaft, gearing intermediate said shaft and the ground wheels, clutch means to connect said shaft with the engine, means for shifting said shaft whereby to render active or inactive the gearing connecting it with the ground wheels, and means to lock the shifting means in a predetermined position.

In testimony whereof I affix my signature.

CHARLES S. McCARTHY, Jr.